(12) United States Patent
Scholz

(10) Patent No.: US 6,393,264 B1
(45) Date of Patent: *May 21, 2002

(54) RADIO TERMINAL APPARATUS

(75) Inventor: Ralf Scholz, Germering (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,023

(22) PCT Filed: Sep. 3, 1996

(86) PCT No.: PCT/DE96/01639

§ 371 Date: Mar. 12, 1998

§ 102(e) Date: Mar. 12, 1998

(87) PCT Pub. No.: WO97/10650

PCT Pub. Date: Mar. 20, 1997

(30) Foreign Application Priority Data

Sep. 15, 1995 (DE) .......................................... 195 34 332

(51) Int. Cl.[7] .............................. H04B 1/18; H04B 1/38
(52) U.S. Cl. ................................ 455/180.1; 455/193.2; 455/552
(58) Field of Search .......................... 455/180.1, 188.1, 455/178.1, 82, 83, 77, 74, 78, 553, 552, 73, 193.1, 193.2, 193.3, 107, 280, 281, 289; 343/702, 895

(56) References Cited

U.S. PATENT DOCUMENTS

| | | | | |
|---|---|---|---|---|
| 3,699,452 A | * | 10/1972 | Lindenmeier et al. | 455/338 |
| 3,906,405 A | * | 9/1975 | Kommrusch | 333/17.3 |
| 4,201,960 A | * | 5/1980 | Skutta et al. | 333/17.3 |
| 4,521,913 A | * | 6/1985 | Huber et al. | 455/121 |
| 4,564,843 A | * | 1/1986 | Cooper | 343/745 |
| 4,682,176 A | * | 7/1987 | Jones | 342/175 |
| 4,723,306 A | * | 2/1988 | Fuenfgelder et al. | 455/103 |
| 4,799,066 A | * | 1/1989 | Deacon | 343/861 |
| 4,806,944 A | * | 2/1989 | Jacomb-Hood | 343/745 |
| 4,855,614 A | * | 8/1989 | Maitre | 327/412 |
| 5,054,114 A | * | 10/1991 | Erickson | 455/78 |
| 5,133,001 A | * | 7/1992 | Bohm | 455/464 |
| 5,187,488 A | * | 2/1993 | Vis | 343/747 |
| 5,291,516 A | * | 3/1994 | Dixon et al. | 375/200 |
| 5,335,368 A | * | 8/1994 | Tamura | 455/90 |
| 5,386,203 A | * | 1/1995 | Ishihara | 333/129 |
| 5,406,615 A | | 4/1995 | Miller, II et al. | |
| 5,423,074 A | * | 6/1995 | Dent | 455/74 |
| 5,473,293 A | * | 12/1995 | Chigodo et al. | 333/104 |

(List continued on next page.)

FOREIGN PATENT DOCUMENTS

| | | | | |
|---|---|---|---|---|
| EP | 0 518 526 A1 | | 5/1992 | |
| EP | 0531125 | * | 3/1993 | |
| JP | 410224142 | * | 8/1998 | H01Q/13/08 |

*Primary Examiner*—Vivian Chang
*Assistant Examiner*—Charles N. Appiah
(74) *Attorney, Agent, or Firm*—Bell Boyd & Lloyd LLC

(57) ABSTRACT

A portable radio terminal apparatus for transmitting and receiving signals in different frequency ranges which has an apparatus for switching the radio terminal apparatus over into a respective frequency range, an antenna and a first antenna matching circuit arrangement for matching the radio terminal apparatus to a first frequency range. The antenna arrangement includes only one antenna whereby at least a second antenna matching circuit arrangement is provided which, given a switching over of the radio terminal apparatus from the first frequency range into a second frequency range, can be connected to the first antenna matching circuit arrangement.

5 Claims, 1 Drawing Sheet

U.S. PATENT DOCUMENTS

| | | | | |
|---|---|---|---|---|
| 5,521,561 A | * | 5/1996 | Yrjola et al. | 333/103 |
| 5,521,607 A | * | 5/1996 | Deasy | 343/745 |
| 5,532,646 A | * | 7/1996 | Aihara | 330/279 |
| 5,634,203 A | * | 5/1997 | Ghaem | 455/134 |
| 5,652,599 A | * | 7/1997 | Pitta et al. | 343/858 |
| 5,784,687 A | * | 7/1998 | Itoh et al. | 455/78 |
| 5,794,158 A | * | 8/1998 | Itoh | 455/550 |
| 5,812,066 A | * | 9/1998 | Terk et al. | 340/825.72 |
| 5,852,421 A | * | 12/1998 | Maldonado | 343/702 |
| 6,026,280 A | * | 2/2000 | Yokomura | 455/78 |
| 6,188,877 B1 | * | 2/2001 | Boesch et al. | 455/74 |

* cited by examiner

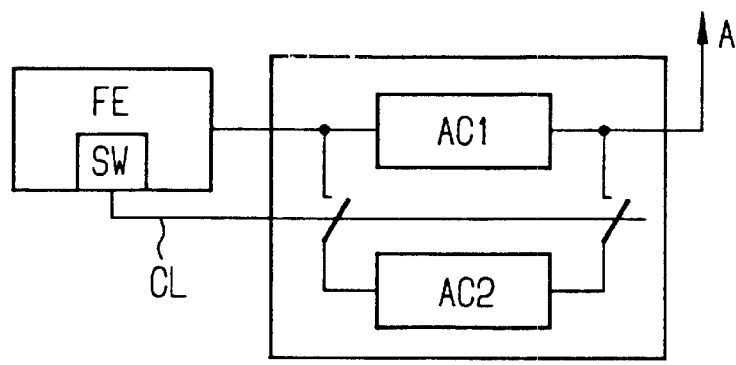
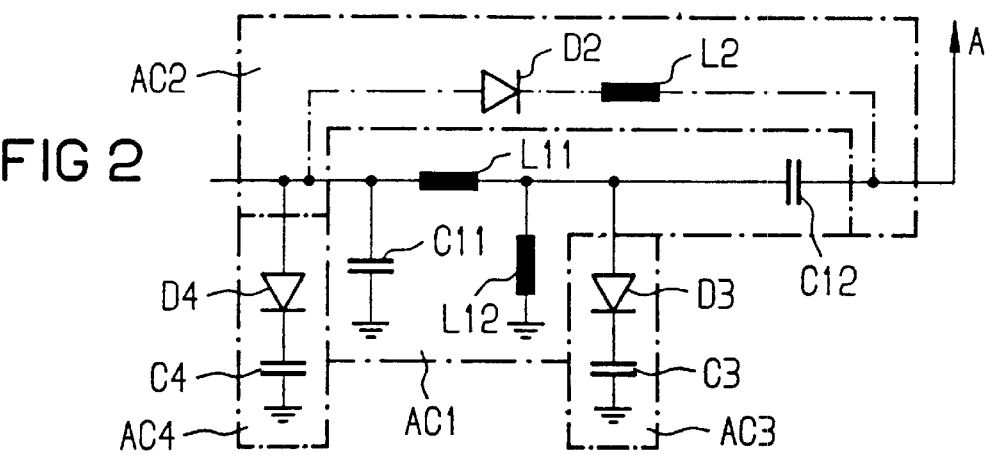
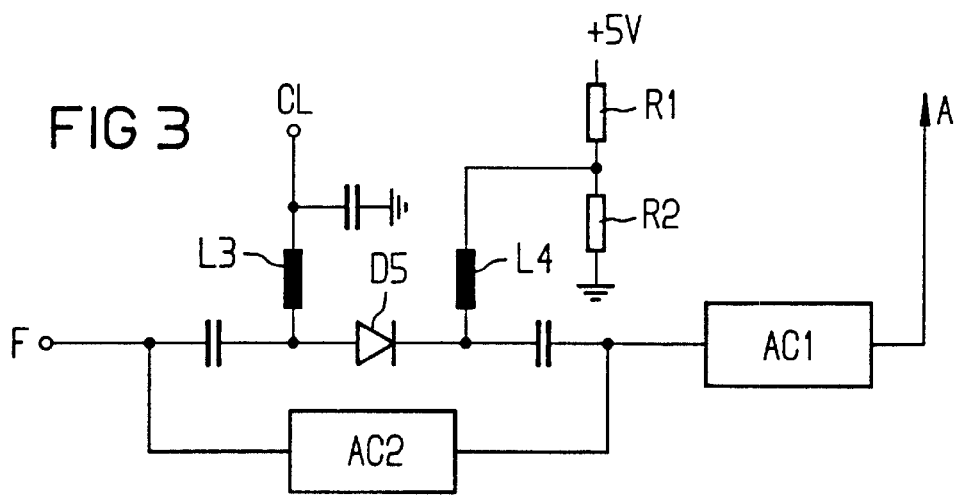

RADIO TERMINAL APPARATUS

BACKGROUND OF THE INVENTION

1. Field of the Invention

The present invention relates to a portable radio terminal apparatus for transmitting and receiving signals in different frequency ranges which includes an apparatus for switching the radio terminal apparatus over into a respective frequency range, a single antenna and a plurality of antenna matching circuits for matching the radio terminal apparatus to one of a number of frequency ranges.

2. Description of the Prior Art

Radio terminal apparatuses, and in particular radio terminal apparatuses that can be operated in different frequency ranges, are already known. These known radio terminal apparatuses are each equipped with either several antennas or several matching circuit arrangements for specific radio ranges. Such an apparatus is known from U.S. Pat. No. 4,989,230. The known apparatus is a telephone terminal apparatus for a private cordless telephone system and a public mobile radiotelephone system which comprises either two system-specific antennas or only one antenna. In the case of only one antenna, a lowpass filter is connected between this antenna and either a cordless telephone receiver circuit part, a cordless telephone transmitter circuit part. A high-pass filter is then connected between the antenna and either the mobile radiotelephone receiver circuit part or the mobile radiotelephone transmitter circuit part.

Radio apparatuses are also known, in particular for the shortwave region, that comprise an antenna with inserted blocking elements (e.g., inductances), so that antenna parts for particular frequency ranges can be switched effective or, respectively, ineffective.

In addition, stationary radio terminal apparatuses with broadband antennas are known whose relatively large mechanical dimensions turn out to be impracticable for portable radio terminal apparatuses.

SUMMARY OF THE INVENTION

The radio terminal apparatus according to the present invention is connected with a multiplicity of radio parts. Independent of the number of frequency ranges in which the inventive radio terminal apparatus can be operated, this apparatus includes only one antenna.

In an embodiment of the present invention, a portable radio terminal apparatus is provided which is capable of transmitting and receiving signals in different frequency ranges. The apparatus includes a switching device for switching the terminal apparatus between different frequency ranges; a single antenna to assist in the transmission and reception of the signals in different frequency ranges; a first antenna matching circuit connected to the antenna for matching the terminal apparatus to a first frequency range; and a plurality of additional antenna matching circuits, each of the plurality of additional antenna matching circuits being connected to the switching device and being individually connectable to the first antenna matching circuit via the switching device, wherein the switching device may connect any combination of the plurality of additional antenna matching circuits to the first antenna matching circuit for matching the terminal apparatus to a respective one of a plurality of frequency ranges.

In an embodiment, the portable radio terminal apparatus further includes a plurality of controllable switchover components in communication with the switching device, wherein each of the plurality of controllable switch over components is connected to one of the plurality of additional antenna matching circuits for enabling and disabling the connection of its respective antenna matching circuit to the first antenna matching circuit.

In an embodiment, the portable radio terminal apparatus includes PIN diodes as the plurality of controllable switchover components.

In an embodiment, the portable radio terminal apparatus further includes a frequency-range-determinative voltage signal produced by the switching device, wherein the voltage signal effects the connection of the plurality of additional antenna matching circuits to the first antenna matching circuit.

In an embodiment, the portable radio terminal apparatus further includes a frequency-range-determinative current signal produced by the switching device, wherein the current signal effects the connection of the plurality of additional antenna matching circuits to the first antenna matching circuit.

Additional features and advantages of the present invention are described in, and will be apparent from, the Detailed Description of the Preferred Embodiments and from the Drawings.

DESCRIPTION OF THE DRAWINGS

FIG. 1 shows an embodiment of the radio terminal apparatus of the present invention having first and second matching circuits.

FIG. 2 shows a schematic circuit diagram of an overall matching circuit arrangement of an embodiment of the radio terminal apparatus of the present invention having first, second, third and fourth matching circuits.

FIG. 3 shows an embodiment of the radio terminal apparatus of the present invention having first and second matching circuits.

DETAILED DESCRIPTION OF THE PREFERRED EMBODIMENTS

The radio terminal apparatus FE shown in FIG. 1, which enables the transmission and reception of signals in different frequency ranges, includes an apparatus SW for switching the radio terminal apparatus into a respective frequency range. In addition, the radio terminal apparatus includes an antenna arrangement A that consists of only one antenna. A first antenna matching circuit arrangement AC1 for matching the radio terminal apparatus to a first frequency range, as well as an additional second antenna matching circuit arrangement AC2 is either connected to the radio terminal apparatus FE or is integrated into it.

By actuation of the switchover apparatus SW, the second matching circuit arrangement AC2 can be connected to the first matching circuit arrangement AC1 via a control line CL. In this switching state, both matching circuit arrangements AC1 and AC2 form an overall matching circuit arrangement for the matching of the radio terminal apparatus to a second frequency range. Additional antenna matching circuit arrangements (not shown in FIG. 1) can be connected to the first and/or second matching circuit arrangement AC1, AC2, so that overall matching circuit arrangement can be formed that serve to match the radio terminal apparatus to additional frequency ranges.

FIG. 2 schematically shows a first matching circuit arrangement AC1, a second matching circuit arrangement AC2, a third matching circuit arrangement AC3, and a fourth matching circuit arrangement AC4. The first matching circuit arrangement AC1 consists, for example, of the inductances L11 and L12, as well as the capacitors C11 and C12. The circuit arranges AC1, AC2, and AC3 and AC4 are connected with the control line CL, as is shown in FIG. 3 with regard to the diode D5. The control line CL can be charged with a predeterminable voltage or with a predeterminable current, as in connection with FIG. 3. The second, third and fourth matching circuit arrangements AC2, AC3, and AC4 each include a controllable component D2, D3, D4, respectively, at the input side, formed in particular by a PIN diode.

By means of the charging of the control line CL with a predeterminable voltage or, respectively, with a predeterminable current, at least one of the PIN diodes D2, D3, D4 is switched to continuity. By this means, the components connected downstream from the respective PIN diode are connected to the first matching circuit arrangement AC1. An inductance L2 is connected downstream from the diode D2, and a capacitor C3 or, respectively, C4 is connected downstream from the diodes D3 and D4. By means of the charging of the control line CL with a frequency-range-specific voltage or, respectively, with a frequency-range-specific current, an overall circuit arrangement can be produced that consists of the following eight matching circuit arrangements:

AC1;

AC1 and AC2;

AC1 and AC3;

AC1 and AC4;

AC1, AC2 and AC3;

AC1, AC2 and AC4;

AC1, AC3 and AC4;

AC1, AC2, AC3 and AC4.

Thus, this embodiment of the inventive radio terminal apparatus can be matched to eight different frequency ranges.

FIG. 3 shows a circuit arrangement that includes a known first matching circuit arrangement AC1 as well as a second matching circuit arrangement AC2. At the input side (input F), the circuit arrangement is connected with the actual radio circuit arrangement. The first circuit arrangement AC1 produces the matching of the antenna in a first frequency range. The overall matching circuit arrangement AC1 and AC2 optimally matches the antenna in a second frequency range. By jumpering the matching circuit AC2 by means of a diode D5, a change is made from the optimal matching in the second frequency range to the optimal matching in the first frequency range. A positive voltage is thereby applied to the control line CL by which the diode D5 is driven and whereby the current is set high enough that the intermodulation products are sufficiently low.

The diode D5 is designed in such a way that it blocks completely when zero voltage is adjacent to the control line CL. For this purpose, the cathode of the diode is set to an intermediate potential that lies between the potential of the control line CL and zero volts. This potential is selected such that, when the control signal is applied, the breakdown voltage of the diode is exceeded sufficiently and such that, when the control line CL is at zero volts, the cathode of the diode lies at a positive voltage potential in relation to the anode. If a diode BAR64 of Siemens AG is used as the PIN diode D5, for example, this intermediate potential is set to 1 to 1.5 volts.

In the circuit arrangement shown in FIG. 3, the controllable component D5 is arranged neither in the first matching circuit arrangement AC1 nor in the second matching circuit arrangement AC2. In general, the controllable component (e.g., D5, D2) is allocated to the first matching circuit arrangement.

The invention thus enables the use of antennas of simple mechanical construction which are already used for mobile radiotelephones in the prior art, though only for the operation of one frequency range. The invention enables the matching of an antenna to arbitrary frequency ranges. These frequency ranges can be either immediately adjacent or arbitrarily separated. An upper boundary frequency, up to which a matching can take place according to the present invention, is determined only by the parasitic losses immanent in the components used.

Although the present invention has been described with reference to specific embodiments, those of skill in the art will recognize that changes may be made thereto without departing from the spirit and scope of the invention as set forth in the hereafter appended claims.

What is claimed is:

1. A portable radio terminal apparatus capable of both transmitting and receiving signals in each of a plurality of different frequency ranges, comprising:

a switching device for switching the terminal apparatus between different frequency ranges;

a single antenna to assist in the transmission and reception of the signals in each of the plurality of different frequency ranges;

a first antenna matching circuit separate and apart from the antenna, the first antenna matching circuit being connected to the antenna for matching the terminal apparatus to a first frequency range; and a plurality of additional antenna matching circuits separate and apart from the antenna, each of the plurality of additional antenna matching circuits being connected to the switching device and being individually connectable to the first antenna matching circuit via the switching device, wherein the switching device may connect any combination of the plurality of additional antenna matching circuits to the first antenna matching circuit for matching the terminal apparatus to a respective one of the plurality of different frequency ranges.

2. A portable radio terminal apparatus as claimed in claim 1, further comprising:

a plurality of controllable switchover components in communication with the switching device, each of the plurality of controllable switching components connected to one of the plurality of additional antenna matching circuits for enabling and disabling the connection of its respective antenna matching circuit to the first antenna matching circuit.

3. A portable radio terminal apparatus as claimed in claim 2, wherein the plurality of controllable switchover components are PIN diodes.

4. A portable radio terminal apparatus as claimed in claim 1, further comprising:

a frequency-range-determinative voltage signal produced by the switching device, the voltage signal effecting the connection of the plurality of additional antenna matching circuits to the first antenna matching circuits.

5. A portable radio terminal apparatus as claimed in claim 1, further comprising:

a frequency-range-determinative current signal produced by the switching device, the current signal effecting the connection of the plurality of additional antenna matching circuits to the first antenna matching circuit.

* * * * *